C. H. VOGLER.
SELF CLEANING TANK.
APPLICATION FILED MAR. 19, 1909.

934,246.

Patented Sept. 14, 1909.

WITNESSES
Lilian Sibley.
Jack A. Fehler.

INVENTOR
Charles H. Vogler
BY
John M. Allman
ATTORNEY

UNITED STATES PATENT OFFICE.

CHARLES H. VOGLER, OF HOUSTON, TEXAS.

SELF-CLEANING TANK.

934,246.

Specification of Letters Patent.  Patented Sept. 14, 1909.

Application filed March 19, 1909. Serial No. 484,572.

*To all whom it may concern:*

Be it known that I, CHARLES H. VOGLER, a citizen of the United States, residing at Houston, in the county of Harris and State of Texas, have invented certain new and useful Improvements in Self-Cleaning Tanks, of which the following is a specification.

My invention relates to new and useful improvements in self cleaning storage or cistern tanks.

The object of the invention is to provide a tank in which the sediment is automatically carried off and the water in the tank maintained in a sanitary and clear condition.

Another feature is to so construct the cleaning apparatus that it will not agitate the water which stirs up the sediment from the bottom of the tank and mixes it with the water thus rendering the same impure.

Finally the object of my invention is to provide a device of the character described that will be strong, durable efficient and simple and comparatively inexpensive to construct also one in which the several parts will not be liable to get out of working order.

Figure 1:
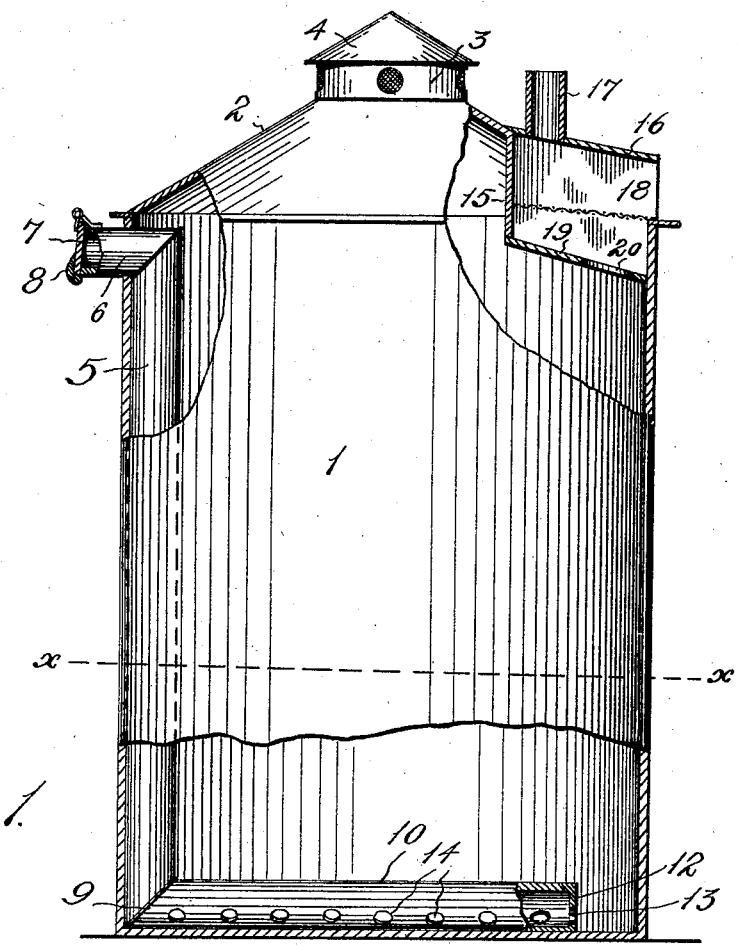
Figure 2:
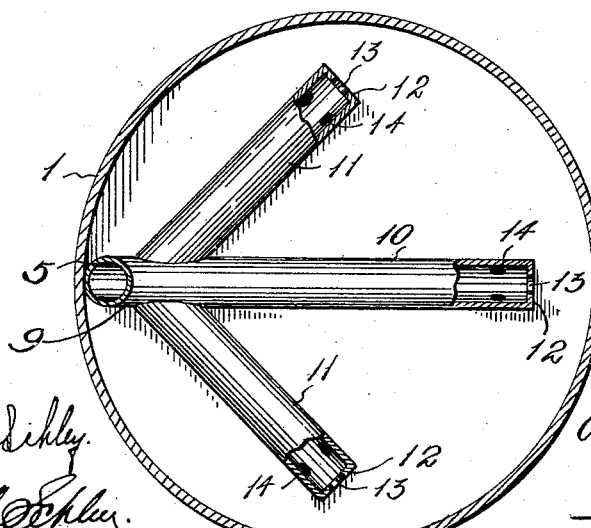

With the above and other objects in view, my invention has particular relation to certain novel features of construction and operation an example of which is described in the following specification and illustrated in the accompanying drawing, wherein:

Figure 1 is an elevation of the tank with parts broken away to show interior constructions, and Fig. 2 is a horizontal sectional view taken on the line x—x of Fig. 1 and showing the suction head partly in section.

In the drawing the numeral 1 designates a tank having a conical dome 2 surmounted at its apex by a screened collar 3 receiving a cap 4.

In carrying out my invention I deliver the water at the top and draw or suck out the sediment by an overflow pipe and suction head. In accomplishing this I mount a vertical over-flow pipe 5 against the inner wall of the tank at one side, terminating at its upper end in an elbow 6 just under the dome and projecting through the side of the tank. The outer end of this elbow is covered by a cap 7 hinged at its upper end and weighted at its lower end as indicated at 8. By this arrangement the cap is held against the end of the elbow and prevented from being blown by the wind, back and forth thereby keeping out insects and other foreign matter. At its lower end the pipe has connection with a head 9 comprising a plurality of suction drums or pipes in radial relation. I prefer to use a central drum 10 terminating near the opposite wall of the tank as shown in Fig. 2; while side drums 11 extend from the central drum each at an angle of about 45 degrees terminating a short distance from the walls of the tank. These drums rest directly on the bottom of the tank and the ends of the same are sealed or closed as indicated at 12 except where a comparatively small opening 13 is provided in each of the same near the bottom of the drum. It is to be noted that these drums are preferably made of sheet metal and have a diameter, internally, varying from 3 to 5 inches according to the size of the tank. Each drum along each side is provided with a plurality of openings 14 below the center of the drum and directed toward the bottom of the tank. The openings being in close proximity to the bottom of the tank and substantially on the underside of the drum, will readily admit the sediment into the drum and more quickly draw off the same than if they were in the top or upper portion of the drums. Also the weight or pressure of the water in the tank has a tendency to drive the sediment into the drums by reason of the openings being on the underside.

At the upper end of the tank diametrically opposite the elbow 6, a casing 15 depends from the dome into the tank. Above the dome, the casing is covered by a hood 16 open at its outer end and receiving near its inner end an inlet pipe 17. Within the casing a transverse screen 18 is mounted inclining outwardly and downwardly at a sufficient angle to carry off leaves and other trash which passes out through the open end of the hood 16. The wall of the tank extends to the bottom of the screen, while the casing has an inclined bottom 19 terminating in close proximity to the wall of the tank and provided near its lower and outer end with an opening 20 as is shown in Fig. 1. It will be noted that the opening 20 and the inlet pipe 17 are out of line, which permits the screen to interrupt the passage of the water sufficiently to obstruct the passage of foreign matter into the tank.

The operation of the tank is as follows: Water passing from the inlet pipe 17 into the casing 15 and through the screen 18, which obstructs and carries off foreign matter, flows into the tank through the opening 20. As the water rises in the tank, it of course rises in the pipe 5 until the overflow point is reached. When this occurs and the overflow pipe 5 and the elbow 6 are full of water so that substantially all the air is excluded, the cap 7 is forced open and the water runs out through the outlet 8. The pressure of the water in the tank drives the sediment to the drums 10 and 11 and is drawn from the bottom of tank through the openings 13 and 14 and is carried off by way of the overflow pipe and the elbow. The openings in the drums being close to the bottom of the tank will effectually assist in removing the sediment from the tank, and the sediment will be easily dislodged and drawn into the drums, and in this way all of the sediment will be carried off and the tank cleaned.

It will be noted that the sediment is not removed by agitation but by the pressure of the water in the tank and further to successfully carry out this operation, the ends of the drum should be sealed and provided with an opening no larger in diameter than the openings in the sides of the drum.

What I claim, is:—

1. In a self-cleaning tank, an inlet pipe terminating at the upper end of the tank, a main drum having extensions resting on the bottom of the tank, each end of the extensions having openings below its center only, and an overflow pipe extending from the drum head to the outside of the tank.

2. The combination with a storage tank having a screened inlet terminating at its upper end, of a plurality of connected drums resting directly on the bottom of the tank, and disposed in radial relation, each of said drums sealed at its outer end and provided with a plurality of openings below its center and having no opening above its center, an overflow pipe extending upwardly in the tank having its ends terminating on the outside thereof, and a hinged closure for the end of the overflow pipe.

In testimony whereof I have signed my name to this specification in the presence of two subscribing witnesses.

CHARLES H. VOGLER.

Witnesses:
 LELAN SCHLEY,
 JACK A. SCHLEY.